(12) United States Patent
Mori

(10) Patent No.: US 8,843,445 B2
(45) Date of Patent: Sep. 23, 2014

(54) STORAGE SYSTEM FOR STORING DATA IN A PLURALITY OF STORAGE DEVICES AND METHOD FOR SAME

(75) Inventor: Kenji Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 264 days.

(21) Appl. No.: 13/146,687

(22) PCT Filed: Jan. 14, 2010

(86) PCT No.: PCT/JP2010/000153
§ 371 (c)(1),
(2), (4) Date: Jul. 28, 2011

(87) PCT Pub. No.: WO2010/100813
PCT Pub. Date: Sep. 10, 2010

(65) Prior Publication Data
US 2011/0295914 A1    Dec. 1, 2011

(30) Foreign Application Priority Data
Mar. 4, 2009   (JP) ................................. 2009-050062

(51) Int. Cl.
*G06F 17/30* (2006.01)
*G06F 3/06* (2006.01)

(52) U.S. Cl.
CPC ............ *G06F 3/0641* (2013.01); *G06F 3/0689* (2013.01); *G06F 3/0608* (2013.01)
USPC ............ 707/640; 707/636; 707/822; 711/162

(58) Field of Classification Search
CPC ............ G06F 11/1451; G06F 11/2094; H04L 67/1095
USPC ........... 707/610, 636, 640, 822, 823; 711/162
See application file for complete search history.

(56) References Cited

U.S. PATENT DOCUMENTS 4,125,873 A * 11/1978 Chesarek ...................... 345/555
5,991,862 A    11/1999 Ruane
(Continued)

FOREIGN PATENT DOCUMENTS

| | | |
|---|---|---|
| CN | 1504894 A | 6/2004 |
| EP | 2402862 A1 | 1/2012 |

(Continued)

OTHER PUBLICATIONS

Mark Russinovich, "NTFS 5.0 no Naibu Kozo-Zenhen", Nikkei Windows2000, Jul. 1, 2001, pp. 216-223, No. 52.

(Continued)

*Primary Examiner* — Leslie Wong
(74) *Attorney, Agent, or Firm* — Sughrue Mion, PLLC

(57) ABSTRACT

A storage system includes: a data storing unit that stores division data configuring a file; a metadata storing unit that stores metadata representing a storing position of the division data; and a data processing unit that stores the division data into the data storing unit and stores the metadata representing the storing position of the division data into the metadata storing unit. Into the metadata storing unit, the data processing unit stores the metadata that has a key part storing position-in-file information representing a position in the file of the division data and an address part storing address information representing a storing position in which the division data is stored corresponding to the position represented by the position-in-file information so as to correspond to the position-in-file information. The key part and the address part are configured by mutually separated data.

14 Claims, 14 Drawing Sheets

(56) References Cited

U.S. PATENT DOCUMENTS

| | | | |
|---|---|---|---|
| 6,101,506 A * | 8/2000 | Ukai et al. | 707/695 |
| 7,143,251 B1 | 11/2006 | Patterson | |
| 7,818,531 B2 * | 10/2010 | Barrall | 711/170 |
| 2002/0069324 A1 | 6/2002 | Gerasimov et al. | |
| 2002/0138504 A1 * | 9/2002 | Yano et al. | 707/204 |
| 2003/0028553 A1 * | 2/2003 | Kondo | 707/200 |
| 2007/0033375 A1 * | 2/2007 | Sinclair et al. | 711/203 |
| 2009/0049260 A1 | 2/2009 | Upadhyayula | |
| 2012/0215980 A1 * | 8/2012 | Auchmoody et al. | 711/118 |

FOREIGN PATENT DOCUMENTS

| | | |
|---|---|---|
| JP | 10-198587 A | 7/1998 |
| JP | 2005-235171 A | 9/2005 |
| JP | 2010198276 A | 9/2010 |
| WO | 2008/005211 A2 | 1/2008 |
| WO | 2008/109321 A1 | 9/2008 |

OTHER PUBLICATIONS

Extended European Search Report dated Jun. 24, 2013 issued by the European Patent Office in counterpart European Application No. 10748418.0.0.

Office Action dated Jul. 30, 2013 issued by the Japanese Patent Office in counterpart Japanese Application No. 2009050062.

Office Action, dated Aug. 12, 2013, issued by the State Intellectual Property Office of the People's Republic of China, in counterpart Application No. 201080006260.X.

* cited by examiner

FIG. 5

| CONTENT ADDRESS | COUNTER |
|---|---|
| CA1 | Counter 1 |
| CA2 | Counter 2 |
| CA3 | Counter 3 |
| ⋮ | ⋮ |
| CAn | Counter n |

| file offset 1 | CA i1 | file offset 2 | CA i2 | ... | file offset 320 | CA i320 |

(B)

| file offset 1 | CA k1 | CA a1 | file offset 2 | CA k2 | CA a2 | ... | file offset 320 | CA k320 | CA a320 |

FIG. 7

(A) 81a: file offset 1 | file offset 2 | file offset 3 | file offset 4 | ... | file offset 317 | file offset 318 | file offset 319 | file offset 320

(B) 81b: CA 1 | CA 2 | CA 3 | CA 4 | ... | CA 317 | CA 318 | CA 319 | CA 320 though many kinds of informaimage_ref # US 8,843,445 B2

STORAGE SYSTEM FOR STORING DATA IN A PLURALITY OF STORAGE DEVICES AND METHOD FOR SAME

CROSS REFERENCE TO RELATED APPLICATIONS

This application is a National Stage of International Application No. PCT/JP2010/000153 filed Jan. 14, 2010, claiming priority based on Japanese Patent Application No. 2009-050062 filed Mar. 4, 2009 the contents of all of which are incorporated herein by reference in their entirety.

TECHNICAL FIELD

The present invention relates to a storage system, and specifically, relates to a storage system that distributes and stores data into a plurality of storage devices.

BACKGROUND ART

In recent years, as computers have developed and become popular, various kinds of information are put into digital data. As a device for storing such digital data, there is a storage device such as a magnetic tape and a magnetic disk. Because data to be stored has increased day by day and the amount thereof has become huge, a high-capacity storage system is required. Moreover, it is required to keep reliability while reducing the cost for storage devices. In addition, it is required that data can be retrieved later with ease. As a result, such a storage system is desired that is capable of automatically realizing increase of the storage capacity and performance thereof, that eliminates a duplicate of storage to reduce the cost for storage, and that has high redundancy.

Under such circumstances, in recent years, a content address storage system has been developed as shown in Patent Document 1. This content address storage system distributes and stores data into a plurality of storage devices, and specifies a storing position in which the data is stored based on a unique content address specified depending on the content of the data.

To be specific, the content address storage system divides predetermined data into a plurality of fragments, adds a fragment as redundant data thereto, and stores these fragments into a plurality of storage devices, respectively. Later, by designating a content address, it is possible to retrieve data, that is, a fragment stored in a storing position specified by the content address and restore the predetermined data before being divided from the plurality of fragments.

Further, the content address is generated so as to be unique depending on the content of data. Therefore, in the case of duplicated data, it is possible to refer to data in the same storing positions to thereby acquire data of the same content. Accordingly, it is not necessary to separately store duplicated data, and it is possible to eliminate duplicated recording and reduce the amount of data.

[Patent Document 1] Japanese Unexamined Patent Application Publication No. JP-A 2005-235171

In a content address storage system, a content address specifying a storing position of stored data is stored as metadata, and specifically, metadata are hierarchically stored as the number of data increases. For example, FIG. 1 shows an example of metadata in the content address storage system. As shown in this drawing, metadata 181, 182 and 171 are composed of key parts 181a, 182a and 171a storing information representing positions of division data in an original file, and address parts 181b, 182b and 171b storing information representing storing positions of the data or other metadata. In a case that the address parts 181b, 182b and 171b store the same content addresses, these address parts refer to data in the same storing position.

However, in the content address storage system described above, for example, as shown by reference numerals 181b and 182b in FIG. 1, data of the same content may be stored in address parts within metadata. That is to say, a problem that content address data may be duplicated and recorded frequently and the amount of data increases arises.

SUMMARY

Accordingly, an object of the present invention is to solve the abovementioned task, that is, eliminate a duplicate record and reduce the amount of data, and provide a storage system that can reduce the cost for storage.

In order to achieve the object, a storage system of an embodiment of the present invention includes:

a data storing unit configured to store division data configuring a file;

a metadata storing unit configured to store metadata representing a storing position of the division data; and a data processing means configured to store the division data into the data storing unit and store the metadata representing the storing position of the division data into the metadata storing unit and, based on the metadata stored in the metadata storing unit, retrieve the division data stored in the data storing unit and reproduce the file.

Then, the data processing means is configured to store the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part and the address part being configured by mutually separated data.

Further, a computer program of another exemplary embodiment of the present invention is a computer program including instructions for causing an information processing device including a data storing unit configured to store division data configuring a file and a metadata storing unit configured to store metadata representing a storing position of the division data, to realize:

a data processing means configured to store the division data into the data storing unit and store the metadata representing the storing position of the division data into the metadata storing unit and, based on the metadata stored in the metadata storing unit, retrieve the division data stored in the data storing unit and reproduce the file.

Then, the data processing means is configured to store the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part and the address part being configured by mutually separated data.

Further, a data structure of data of another exemplary embodiment of the present invention is a data structure of data stored in a metadata storing unit in a storage system including:

a data storing unit configured to store division data configuring a file;

the metadata storing unit configured to store metadata representing a storing position of the division data; and a data processing means configured to store the division data into the data storing unit and store the metadata representing the storing position of the division data into the metadata storing unit and, based on the metadata stored in the metadata storing unit, retrieve the division data stored in the data storing unit and reproduce the file.

Then, the data structure of the data has the metadata having a key part configured to store position-in-file information representing a position in the file of the division data and an address part configured to store address information representing a storing position in which the division data is stored corresponding to the position represented by the position-in-file information so as to correspond to the position-in-file information, the metadata having the key part and the address part configured by mutually separated data.

Further, a data processing method of another exemplary embodiment of the present invention includes, in an information processing device that includes a data storing unit configured to store division data configuring a file and a metadata storing unit configured to store metadata representing a storing position of the division data:

storing the division data into the data storing unit and storing the metadata representing the storing position of the division data into the metadata storing unit; and retrieving the division data stored in the data storing unit and reproducing the file based on the metadata stored in the metadata storing unit.

Then, the data processing method further includes: at the time of storing the division data or at any timing, storing the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part and the address part being configured by mutually separated data.

With the configurations as described above, the present invention can reduce the storage amount of metadata and reduce the storage amount in the whole storage system, thereby reducing the cost for storage.

BRIEF DESCRIPTION OF DRAWINGS

FIG. 5 is a view showing an example of a content address table stored in the storage system disclosed in FIG. 3;

FIGS. 6A and 6B are views each showing an example of metadata stored in a root node and an index node of the storage system disclosed in FIG. 3;

FIGS. 7A and 7B are views each showing an example of metadata stored in a leaf node of the storage system disclosed in FIG. 3;

EXEMPLARY EMBODIMENTS

<First Exemplary Embodiment>

Figure 2:
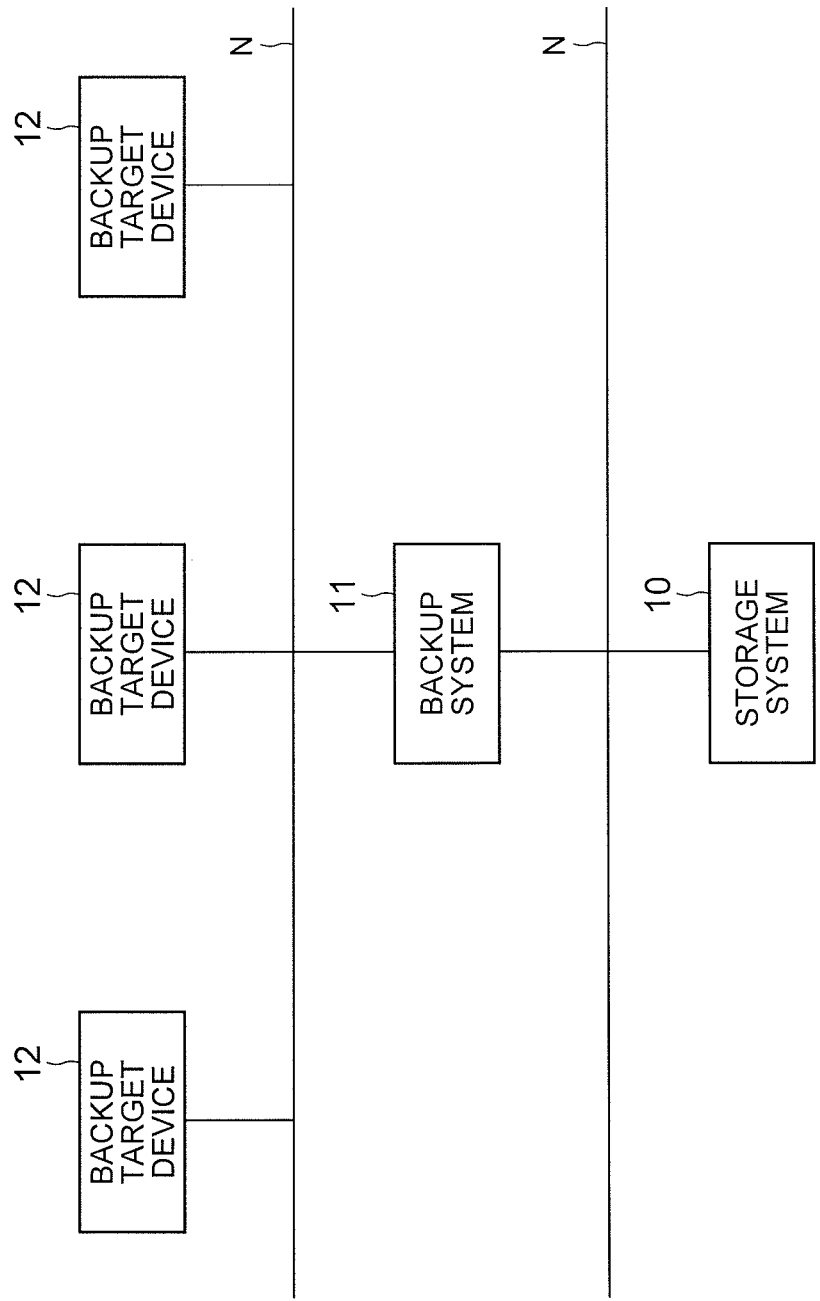
FIG. 2 is a block diagram showing a configuration of a whole system including a storage system of a first exemplary embodiment of the present invention.
Figure 3:
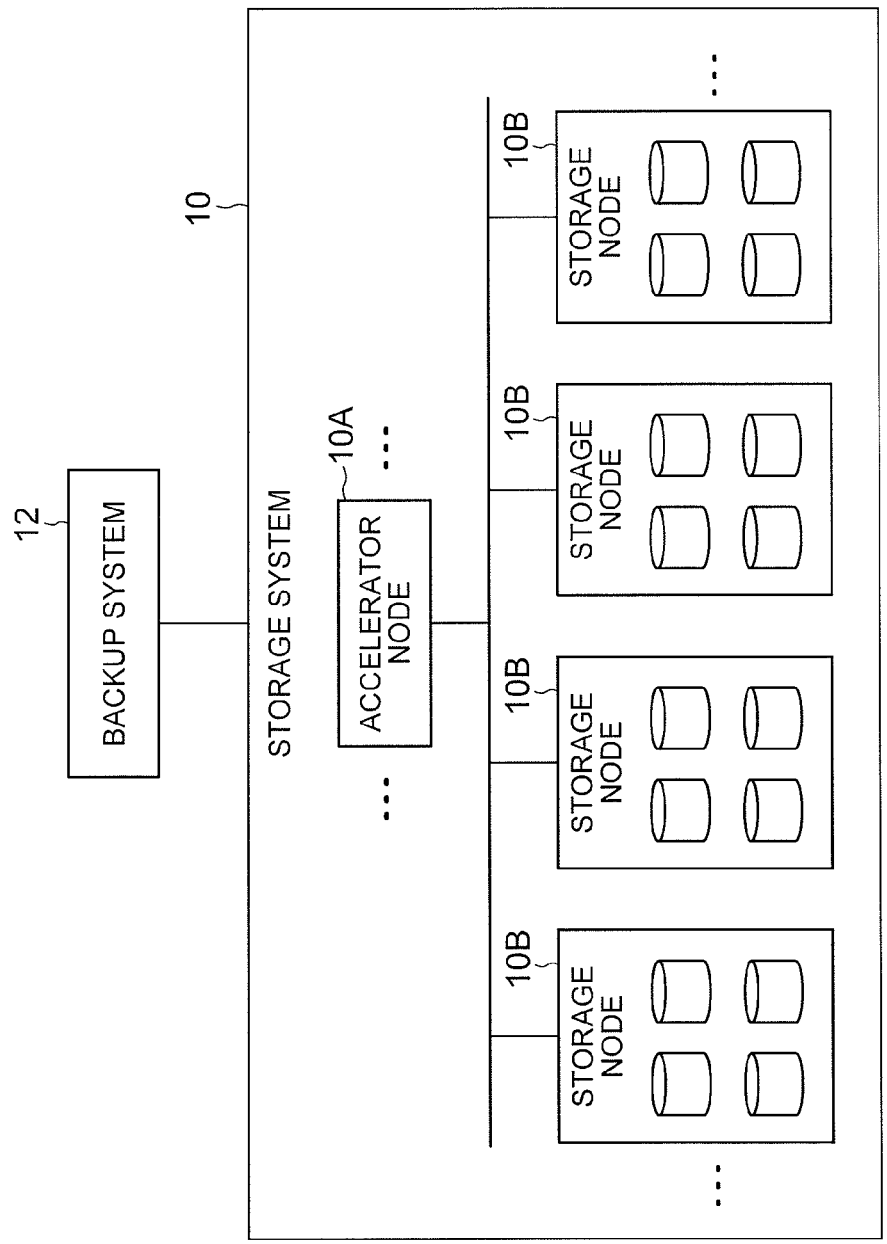
FIG. 3 is a block diagram showing a schematic configuration of the storage system of the first exemplary embodiment of the present invention.
Figure 4:
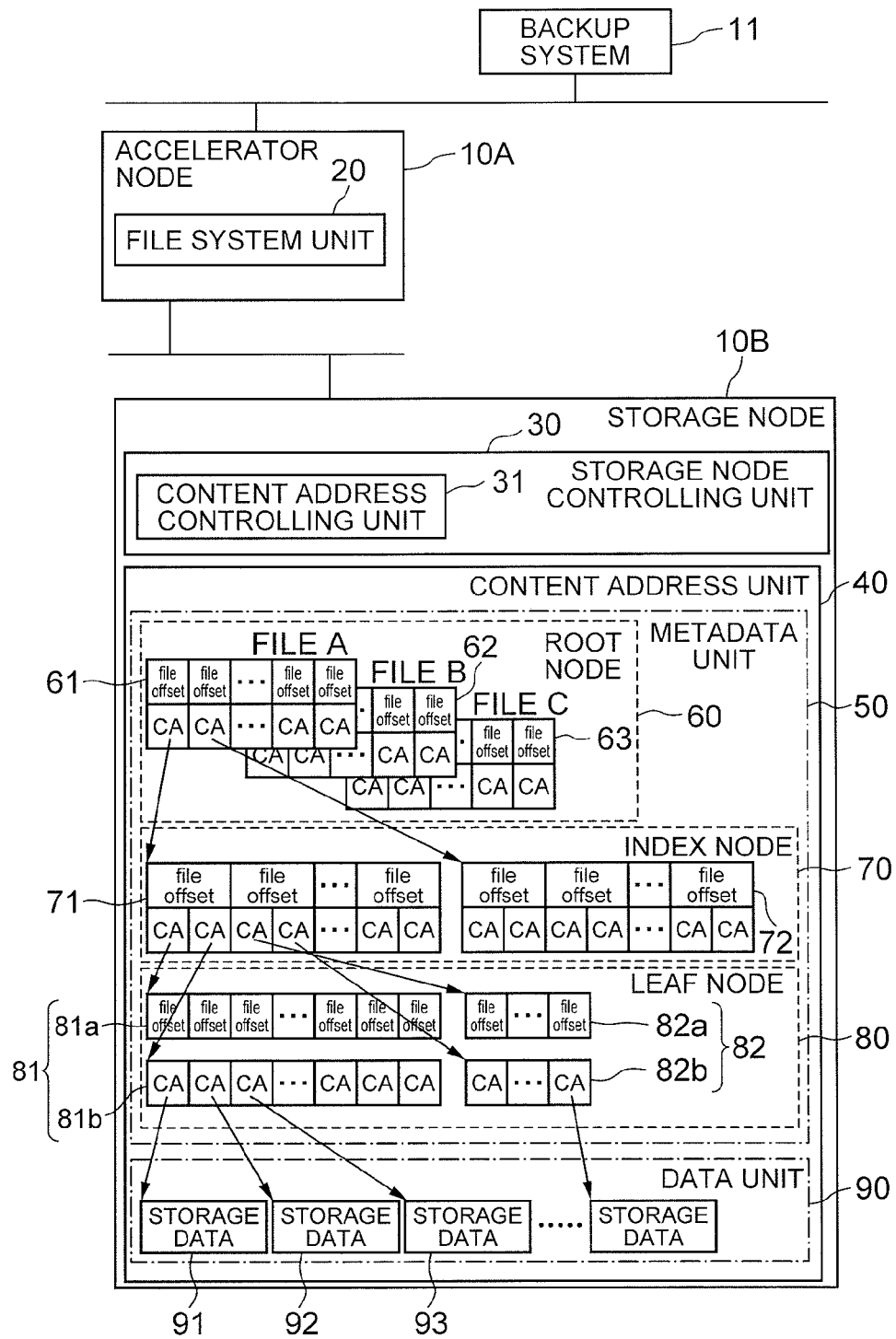
FIG. 4 is a view showing a configuration of the storage system disclosed in FIG. 3 and a structure of stored data.
Figure 8:
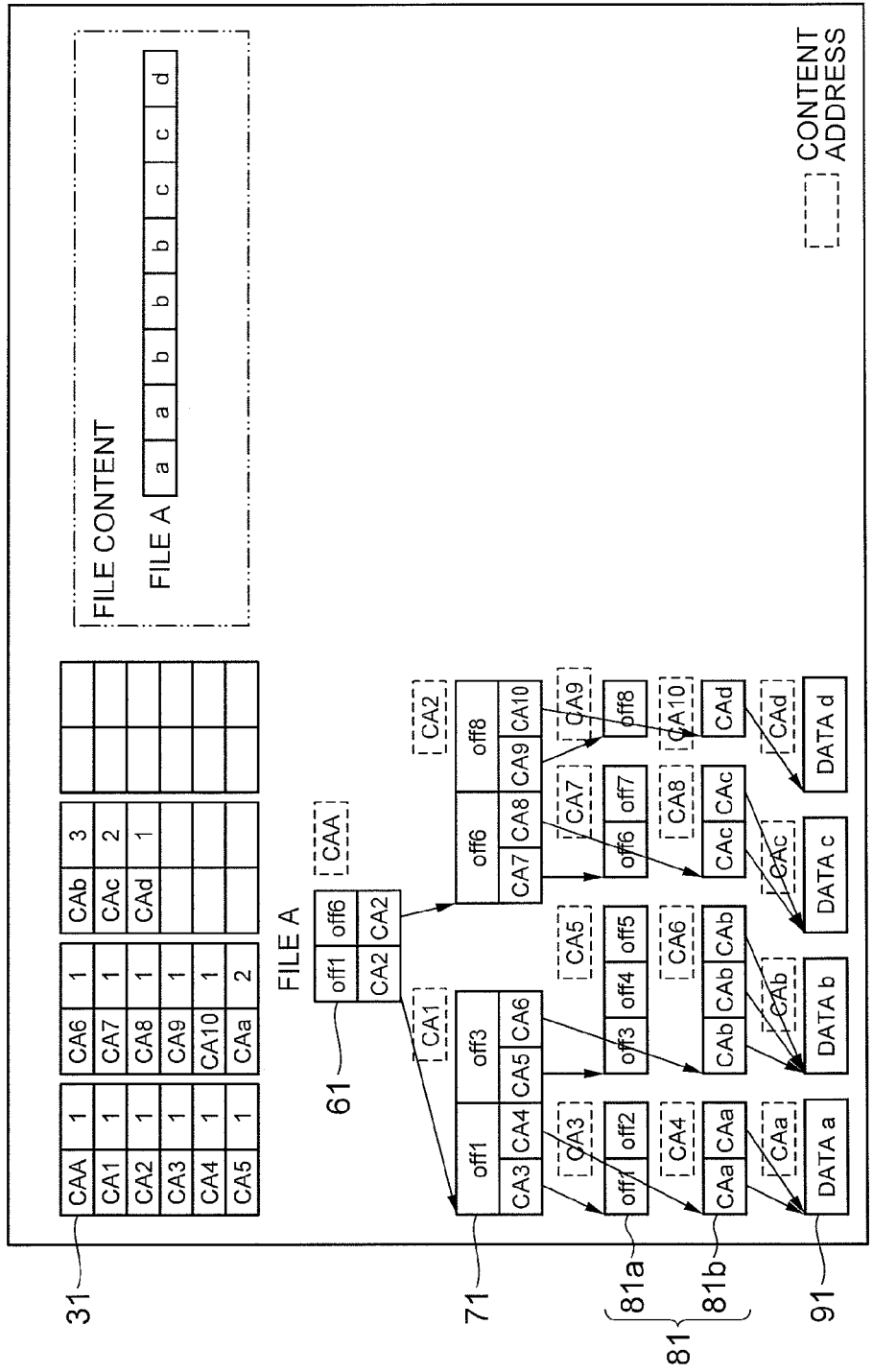
FIG. 8 is a view showing an aspect of data processing in the storage system disclosed in FIG. 3.
Figure 9:
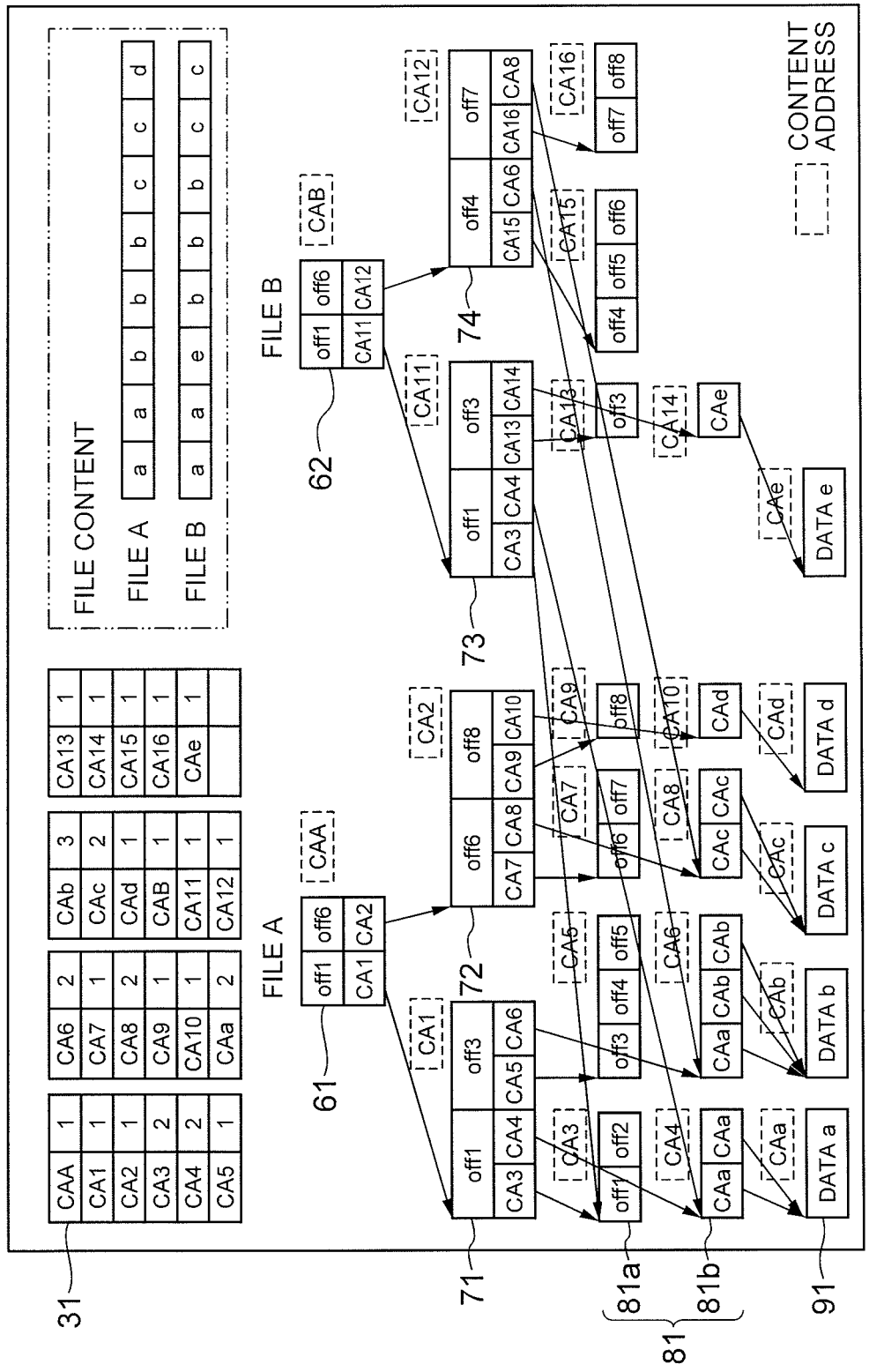
FIG. 9 is a view showing an aspect of data processing in the storage system disclosed in FIG. 3.
Figure 10:
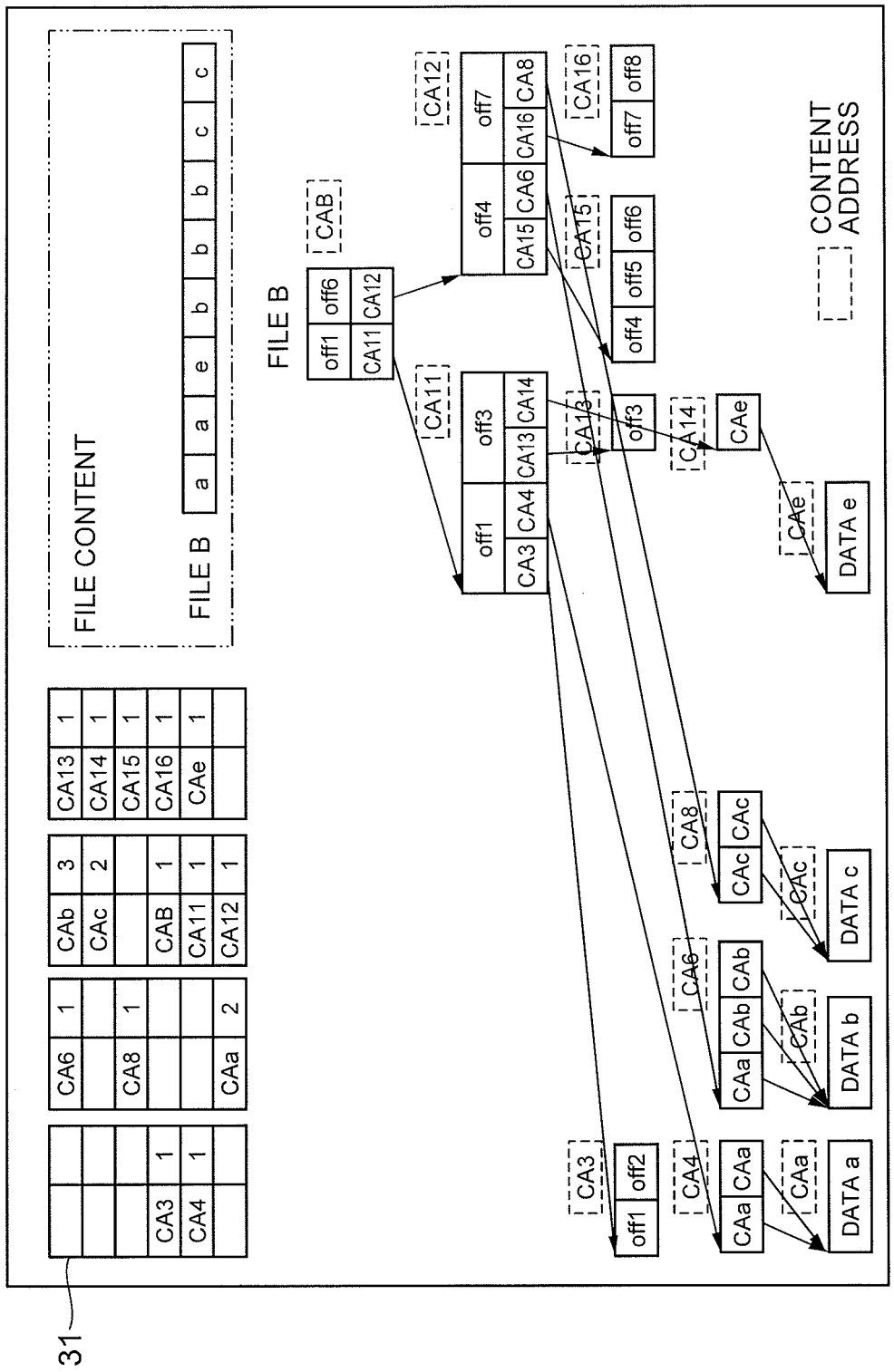
FIG. 10 is a view showing an aspect of data processing in the storage system disclosed in FIG. 3.

A first exemplary embodiment of the present invention will be described with reference to FIGS. 2 to 10. FIG. 2 is a block diagram showing a configuration of a whole system. FIG. 3 is a block diagram schematically showing the storage system, and FIG. 4 is a view showing a configuration and a structure of stored data. FIG. 5 is a view showing an example of a content address table. FIGS. 6 and 7 are views showing examples of stored metadata. FIGS. 8 to 10 are views showing examples of data processing.

This exemplary embodiment shows a specific example of a storage system disclosed in a fourth exemplary embodiment described later. Below, a case of configuring the storage system by connecting a plurality of server computers will be described. However, the storage system of the present invention is not limited to being configured by a plurality of computers, and may be configured by one computer.

[Configuration]

As shown in FIG. 2, a storage system 10 of the present invention is connected to a backup system 11 that controls a backup process via a network N. The backup system 11 acquires a backup target file (a file) stored in a backup target device 12 connected via the network N, and requests the storage system 10 to store. Consequently, the storage system 10 stores the backup target file requested to be stored as a backup.

Further, as shown in FIG. 3, the storage system 10 of this exemplary embodiment employs a configuration in which a plurality of server computers are connected. To be specific, the storage system 10 is equipped with an accelerator node 10A serving as a server computer that controls a storing and reproducing operation by the storage system 10, and a storage node 10B serving as a server computer equipped with a storage device that stores data. The number of the accelerator nodes 10A and the number of the storage nodes 10B are not limited to those shown in FIG. 3, and the storage system may be configured by connecting more nodes 10A and more nodes 10B.

The accelerator node 10A is equipped with a file system unit 20 constructed by installing an accelerator node program as shown in FIG. 4. This file system unit 20 has a function of managing backup target files acquired from the backup system 11, data storing positions in which the data are actually stored, and so on, so as to be retrievable later. A description of a more detailed configuration of the accelerator node 10A will be omitted.

The storage node 10B is equipped with a storage node controlling unit 30 (a data processing means) and a content address unit 40 as shown in FIG. 4. The storage node controlling unit 30 is equipped with a content address controlling unit 31. The storage node controlling unit 30 is realized by installing a storage node program into a CPU (Central Processing Unit) of the storage node 10B.

The program is provided to the respective nodes 10A and 10B in a state stored in a storage medium such as a CD-ROM, for example. Alternatively, the program may be stored in a storage device of another server computer on the network and provided to the respective nodes 10A and 10B from the other server computer via the network.

The content address unit 40 is configured in a storage device and, as described later, equipped with a metadata unit 50 (a metadata storing unit) that stores metadata and a data unit 90 (a data storing unit) that stores division data configuring a file. To be specific, the metadata unit 50 has a root node 60, an index node 70 and a leaf node 80 that store metadata representing storing positions of data stored in the data unit 90. The respective metadata stored in the root node 60, the index node 70 and the leaf node 80 are newly generated or updated and stored by the storage node controlling unit 30 at the time of storing data or at any time. A data structure of metadata stored by the storage node controlling unit 30 into the root node 60, the index node 70 and the leaf node 80 will be described later. Moreover, the content address controlling unit 31 of the storage node controlling unit 30 stores and manages the content address table in the stored data, and will be described in detail later.

Next, with reference to FIG. 4, stored data that is stored in the data unit 90 and the respective metadata that are stored in the root node 90, the index node 70 and the leaf node 80 and represent the storing positions of the stored data, which are subjected to a storing process by the storage node controlling unit 30, will be described in detail.

Firstly, stored data 91, 92 and 93 stored in the data unit 90 are division data obtained by dividing a storage target file stored in the storage system.

Metadata 81 and 82 stored in the leaf node 80 are data representing the storing positions of the stored data 91, 92, etc. To be specific, as shown in the drawing, the metadata 81 stored in the leaf node 80 has an address part 81b storing content addresses (CA) that are address information representing the storing positions of the stored data 91, etc., and a key part 81a storing position-in-file information (file offset) representing relative positions within the file before being divided like the stored data 91. The key part 81a and the address part 81b are formed by mutually separated files (data).

An example of an actual storing state of the metadata stored in the leaf node 80 is shown in FIGS. 7A and 7B. FIG. 7A shows a file forming the key part 81a, and FIG. 7B shows a file forming the address part 81b. Although the key part 81a and the address part 81b are mutually separated files as mentioned above, data stored in the respective parts, namely, file offset (position-in-file information) and CA (content addresses) correspond to each other in the storing order. For example, file offset 1 corresponds to CA 1, and file offset 2 corresponds to CA 2. The key part 81a and the address part 81b each store 320 pieces of data at the maximum.

The CA (content addresses) stored in the address part 81b refers to the stored data 91, etc., stored in the data unit 90, and is data unique to the storing position of the stored data 91, etc. For example, CA is data generated so as to include part of a hash value generated based on the data content of stored data referred to by the CA and information representing physical position information. Moreover, the file offset stored in the key part 81a is data representing an in-file relative position in the file before being divided like the stored data 91 referred to by corresponding CA. For example, as shown in FIGS. 7A and 7B, in a case that file offset 1 and file offset 2 are stored in this order in the key part 81a, the stored data 91 and 92 stored in the data unit 90 corresponding to CA 1 and CA 2 corresponding to the file offset 1 and the file offset 2 are positioned in this order in the file before being divided.

Next, metadata 71 and 72 stored in the index node 70 will be described. The metadata 71 (upper metadata) stored in the index node 70 is data representing a storing position of the metadata 81 stored in the leaf node 80 described above. To be specific, as shown in FIG. 4, the metadata 71 stored in the index node 70 has, on the lower stage, an address part (an upper meta-address part) that stores content addresses (CA) as address information referring to the key part 81a and address part 81b, respectively, composing the metadata 81 stored in the leaf node 80. Moreover, the metadata 71 has, on the upper stage, a key part (an upper meta-key part) that stores position-in-file information (file offset) representing a relative position in a file before being divided of stored data referred to by the address part.

To be specific, in this exemplary embodiment, the metadata 71 stored in the index node 70 stores the content addresses (CA) referring to the key part 81a and the address part 81b, respectively, composing the metadata 81 within the leaf node 80 positioned in a lower hierarchy, so as to correspond to one file offset (position-in-file information) positioned on the upper stage (the upper meta-key part) described above. That is to say, in FIG. 4, the two content addresses corresponding to the file offset on the left end of the metadata 71 refer to the metadata 81 composed of the key part denoted by reference numeral 81a and the address part denoted by reference numeral 81b.

Further, the respective content addresses (CA) stored in the address part positioned on the lower stage of the metadata 71 stored in the index node 70 are data unique to the storing positions of the key part 81a and the address part 81b within the leaf node 80 referred to by the content addresses. For example, the content addresses are data generated so that part of hash values generated based on the data contents of the key part 81a and the address part 81b referred to by the content addresses and information representing physical position information are included.

Further, the abovementioned file offset stored in the key part positioned on the upper stage of the metadata 71 stored in the index node 70 is data representing an in-file relative position in a file before being divided of stored data referred to by corresponding CA. In other words, the file offset represents the order in a file before being divided of the stored data 91, etc., that is referred to by the metadata 81, 82, etc., within the leaf node 80 referred to by the CA and that is finally specified.

An example of an actual storing state of the metadata 71 stored in the index node 70 is shown in FIG. 6B. In this drawing, "file offset (number)" represents each file offset. Moreover, "CA k(number)" represents a content address showing a key part of metadata within the leaf node referred to thereby, and "CA a(number)" represents a content address showing an address part of metadata within the leaf node referred to thereby. As shown in this drawing, a file is configured by "file offset (number)" and "CA k(number)" and "CA a(number)" corresponding thereto arranged in this order. The metadata 71 stored in the index node 70 stores 320 groups of data at the maximum.

Next, metadata 61, 62 and 63 stored in the root node 60 will be described. The metadata 61 stored in the root node 60 is data positioned on the top of the metadata described above and representing the storing position of the metadata 71 stored in the index node 70. To be specific, as shown in FIG. 4, the metadata 61 stored in the root node 60 has an address part that stores a content address (CA) as address information representing the storing position of the metadata 71 stored in the index node 70, and a key part that stores position-in-file information (file offset) representing a relative position in a file before being divided of stored data referred to by the CA. The key part and the address part are stored so as to correspond to each other.

The abovementioned CA (content address) stored in the address part is data unique to the storing position of the metadata 71 within the index node 70 referred to by the CA. For example, the CA is data generated so that part of a hash value generated based on the data content of the metadata 71 referred to by the CA and information representing physical position information are included. Moreover, the abovementioned file offset stored in the key part is data representing an in-file relative position of stored data referred to by the corresponding CA. That is to say, the file offset represents the order in a file before being divided of the stored data 91, etc., that is referred to by the metadata 81, 82, etc., within the leaf node 80 referred to by the index node 71 referred to by the CA and that is finally specified.

The metadata denoted by reference numeral 61 is metadata equivalent to a file A. That is to say, by using stored data referred to by following all of the metadata referred to by this metadata 61 (the metadata 71, 81, etc., within the index node 70 and the leaf node 80), it is possible to configure the file A before being divided.

An example of an actual storing state of the metadata stored in the root node 60 is shown in FIG. 6A. In this drawing, "file offset (number)" represents each file offset. Moreover, "CA (i+number)" (e.g., CA i1, CA i2) represents a content address showing metadata within the index node referred to thereby. As shown in this drawing, a file is configured by "file offset (number)" and "CA (i+number)" corresponding thereto arranged in this order. The metadata 61 stored in the root node 60 stores 320 groups of data at the maximum.

As described above, when storing a file, the storage node controlling unit 30 divides the file and stores division data thereof into the data unit 90. The respective metadata referring to the stored data are hierarchically generated or updated as shown in FIG. 4. At this moment, the storage node controlling unit 30 can inhibit duplicate storage of metadata and stored data by generating content addresses (CA) of metadata so as to refer to existing other metadata and stored data positioned in lower hierarchies.

Further, when retrieving a file, the storage node controlling unit 30 follows destinations referred to by the respective metadata and retrieves the stored data 91, etc., having been referred to, thereby generating and retrieving the file. For example, assuming data is stored as shown in FIG. 4, when retrieving the file A, the storage node controlling unit 30 follows the metadata 61 within the root node 60 referring to the file A, the metadata within the index node 70 referred to by the metadata 61 and the metadata within the leaf node 80, and retrieves a plurality of stored data having been finally referred to. Then, the storage node controlling unit 30 reproduces the file in the order represented by the file offsets within the respective metadata.

Next, a content address table (an address table) managed by the content address controlling unit 31 included by the storage node controlling unit 30 will be described. An example of the content address table is shown in FIG. 5.

As shown in this drawing, the content address table stores, in a "content address section," the types of content addresses (CA) stored in the address parts of all of the metadata described above. Moreover, the content address table stores, in a "counter section," the number of times each of the content addresses (CA) refers to other data (stored data, metadata (including a key part file and an address part file composing metadata)).

The content address controlling unit 31 updates the content address table when stored data is newly stored or stored data is deleted and metadata are thereby generated or updated. To be specific, the content address controlling unit 31 updates by storing the number of times each of the content addresses (CA) refers to other data, into the content address table.

Further, the storage node controlling unit 30 deletes other data referred to by a content address (CA) whose counter becomes "0," namely, a content address whose number of referring data becomes "0" as a result of update of the content address table described above.

[Operation]

Next, an example of an operation of the storage system described above will be described with reference to FIGS. 8 to 10. Firstly, an aspect when the file A is stored in the storage system will be described with reference to FIG. 8. The file A has a data structure [a, a, b, b, b, c, c, d] as shown in FIG. 8. Moreover, reference symbol surrounded by a dashed line in the drawing denotes a content address representing a storing position of each data and is unique to the data.

Firstly, when the file A is stored, data a (DATAa), data b (DATAb), data c (DATAc) and data d (DATAd) that are elements of division data configuring the file A are stored into the data unit 90. In a case that data have the same content, only one of the data is stored.

Then, metadata referring to the stored data a, b, c and d are stored. Arrows in the drawing indicate data referred to by the respective content addresses (CA). For example, "DATAa" is being referred to by content addresses "CAa, CAa" stored in the address part 81*b* composing the metadata 81 stored in the leaf node 80. In other words, a content address representing the storing position of "DATAa" is "CAa." The content addresses "CAa, CAa" of the address part 81*b* correspond to position-in-file information "off1, off2" stored in the key part 81*a*, respectively, that compose the metadata 81*b* paired with the address part 81*b* but separated therefrom.

Further, the metadata 81 stored in the leaf node 80 is referred to by the metadata 71 stored in the index node 70. To be specific, the key part 81*a* and the address part 81*b* composing the metadata 81 within the leaf node 80 are being referred to by content addresses "CA3, CA4" stored in the address part of the metadata 71 within the index node 70, respectively. In other words, a content address representing the storing position of the key part 81*a* composing the metadata 81 is "CA3," and a content address representing the storing position of the address part 81*b* is "CA4." Moreover, these content addresses "CA3, CA4" correspond to the one position-in-file information "off1" stored in the metadata 71. This metadata 71 stores position-in-file information and content addresses referring to other data following the DATAa configuring the file A.

Further, the metadata 71 stored in the index node 70 is referred to by the metadata 61 stored in the root node 60. To be specific, the metadata 71 within the index node 70 is being referred to by a content address "CA1" stored in the address part of the metadata 61 within the root node 60. In other words, a content address representing the storing position of the metadata 71 is "CA1." Moreover, the content address "CA1" corresponds to the position-in-file information "off1"

stored in the metadata 61. This metadata 61 stores position-in-file information and content addresses referring to other data following data referred to by the CA1, in order to configure the file A. In other words, by using all of the stored data positioned at the destination referred to by the content address stored in the root node 60, it is possible to generate the file A.

The content address table is updated based on the respective metadata described above as shown in FIG. 8. Herein, the counter number of each of the content addresses is the number of data the content address refers to, that is, the number of arrows coming from the respective content addresses with reference to FIG. 8.

Next, an aspect when a file B is stored will be described with reference to FIG. 9. The file B has a data structure [a, a, e, b, b, b, c, c] as shown in FIG. 9.

Firstly, when the file B is stored, data a (DATAa), data e (DATAe), data b (DATAb) and data c (DATAc) as elements of division data configuring the file B are stored into the data unit 90. In a case that data have the same content, only one of the data is stored. Therefore, only DATAe is added and stored at this moment.

In accordance with the data structure of the file B described above, metadata referring to the stored data a, e, b and c are generated or updated, and stored. Since the data structure "a, a" on the beginning side of the file B has already been stored when the file A has been stored, the metadata 81 (the key part 81a, the address part 81b) stored in the leaf node 80 referring to the abovementioned "DATAa" is used. That is to say, the metadata 81 within the leaf node 80 is referred to by metadata 73 within the index node 70 positioned in an upper hierarchy than the leaf node 80. To be specific, the key part 81a and the address part 81b composing the existing metadata 81 within the leaf node 80 are being referred to by content addresses "CA3, CA4" stored in an address part of the metadata 73 within the index node 70, respectively. In other words, the content addresses "CA3, CA4" of the key part 81a and the address part 81b composing the existing metadata 81 within the leaf node 80 are referred to by the metadata 73. Moreover, the content addresses "CA3, CA4" correspond to one position-in-file information "off1" stored in the metadata 73. The metadata 73 stores position-in-file information and content addresses referring to the other following data, in order to configure the file B.

Further, the metadata 73 stored in the index node 70 is referred to by metadata 62 stored in the root node 60. To be specific, the metadata 73 within the index node 70 is being referred to by a content address "CA11" stored in an address part of the metadata 62 within the root node 60. Moreover, this content address "CA11" correspond to position-in-file information "off1" stored in the metadata 62. This metadata 62 stores position-in-file information and content addresses referring to the other data following data referred to by CA11, in order to configure the file B. In other words, by using all of the stored data positioned at destinations referred to by the content addresses stored in the root node 60, it is possible to generate file B.

Metadata 74 within the index node 70 referred to by a content address CA12 of the metadata 62 of the root node 60 will be described. This metadata 74 stores content addresses "CA15, CA6" corresponding to one position-in-file information "off4." In other words, the content address CA15 refers to a key part (shown by the content address CA15) forming part of metadata newly generated within the leaf node 80, whereas the content address CA6 refers to the address part (data shown by the content address CA6) forming part of the existing metadata generated for referring to the data of the file A. Alternatively, one of a pair of content addresses corresponding to one position-in-file information stored in the index node 70 may refer to another existing key part, and the other refers to another address part newly generated.

Then, the content address table is updated based on the respective metadata described above as shown in FIG. 9. To be specific, when a new kind of content address is generated, the content address is added and, when the reference count of an existing content address increases, the counter is updated.

Next, an aspect when the file A is deleted will be described with reference to FIGS. 9 and 10. When the file A is deleted, the metadata referring to the file A are deleted. For example, the metadata 61 corresponding to the file A stored in the root node 60 shown in FIG. 9 is deleted. Since the content addresses CA1 and CA2 stored in this metadata 61 are deleted, the counters within the content address table, which are the reference counts the content addresses CA1 and CA2 refer to other data, are respectively decreased by "1." Then, since the reference counts of the content addresses CA1 and CA2 become "0," the metadata 71 and 72 within the index node 70 referred to by the content addresses CA1 and CA2 are deleted.

Then, since the content addresses CA3, etc., stored in the deleted metadata 71 and 72 are deleted in a like manner as described above, the content address table is updated as well. Since the counter of the content address CA3 changes from "2" to "1," which is not "0," the metadata referred to by the content address CA3 are not deleted.

Thus, metadata and stored data whose reference counts become "0" are deleted, whereas metadata and stored data whose reference counts are not "0" are left as they are. Consequently, other metadata and stored data that are not referred to by any metadata and are therefore unnecessary can be deleted as shown in FIG. 10, and it is possible to eliminate duplicate of data with efficiency. Moreover, since duplicate data is eliminated as mentioned above, the kinds of content addresses are decreased and management of the content address table is facilitated.

<Second Exemplary Embodiment>

Figure 11:
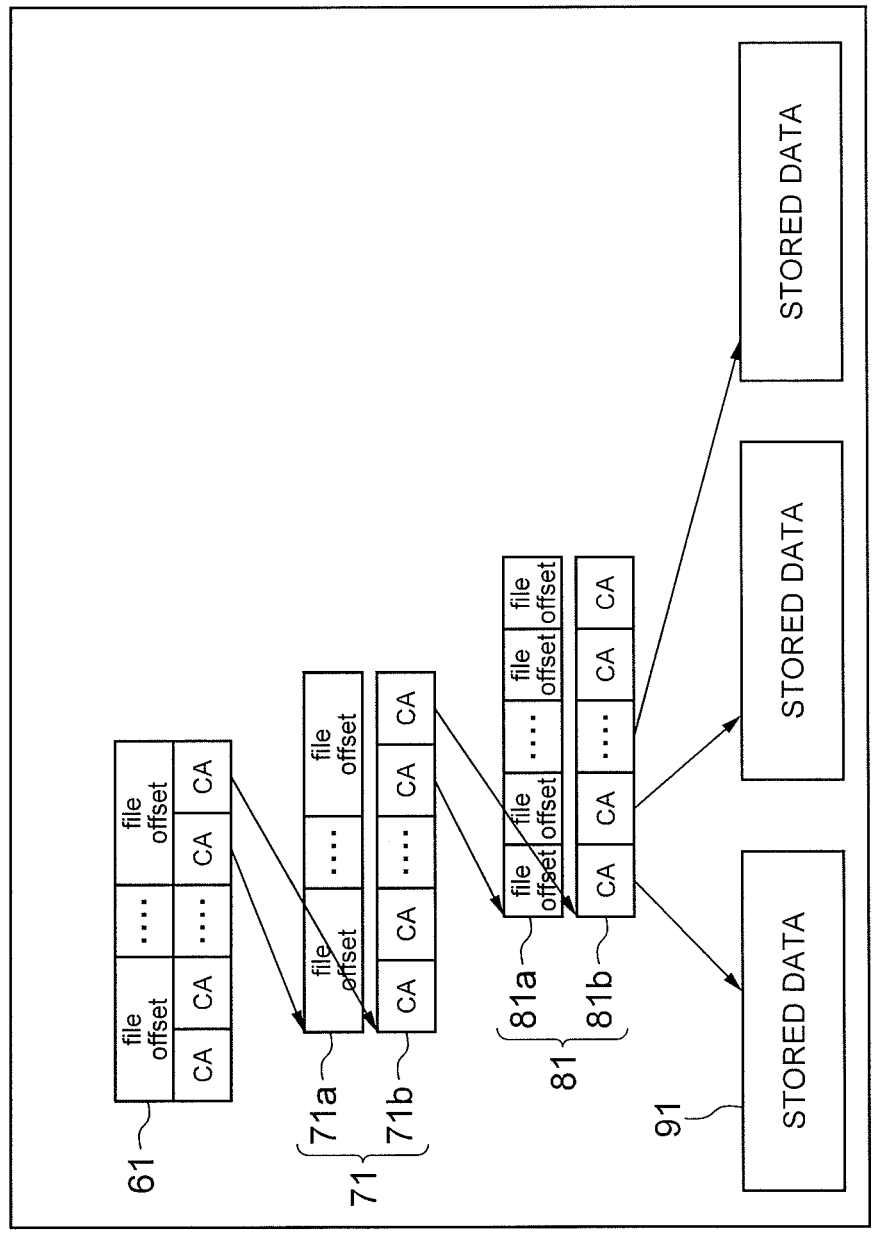
FIG. 11 is a view showing a structure of data stored in a storage system of a second exemplary embodiment of the present invention.

Next, a second exemplary embodiment of the present invention will be described with reference to FIG. 11. FIG. 11 is a view showing an aspect of data stored in a storage node of this exemplary embodiment.

The storage node controlling unit 30 of a storage system of this exemplary embodiment employs almost the same configuration as in the first exemplary embodiment described above, but specifically, a configuration of stored metadata is different. To be specific, the metadata 71 stored in the index node 70 described above is formed by a key part 71a and an address part 71b, which are different files separated from each other, as shown in FIG. 11.

Accordingly, in this exemplary embodiment, the metadata 61 stored in the root node 60 described above stores content addresses (CA) referring to the file of the key part 71a and the file of the address part 71b, respectively, composing the metadata 71 within the index node 70 positioned in a lower hierarchy, so as to correspond to one file offset (position-in-file information) positioned on the upper stage described above as shown in FIG. 11. That is to say, the metadata 61 of the root node 60 in this exemplary embodiment employs almost the same configuration as the metadata stored in the index node in the first exemplary embodiment.

Thus, by configuring metadata positioned in an upper hierarchy so that a key part and an address part are separated, it is possible to refer to existing other metadata positioned in a lower hierarchy, specifically, other key part file and address part file separated from each other and configuring the metadata, respectively, and it is possible to eliminate duplicate data. As a result, it is possible to further reduce the storage amount of the whole storage system.

<Third Exemplary Embodiment>

Figure 12:
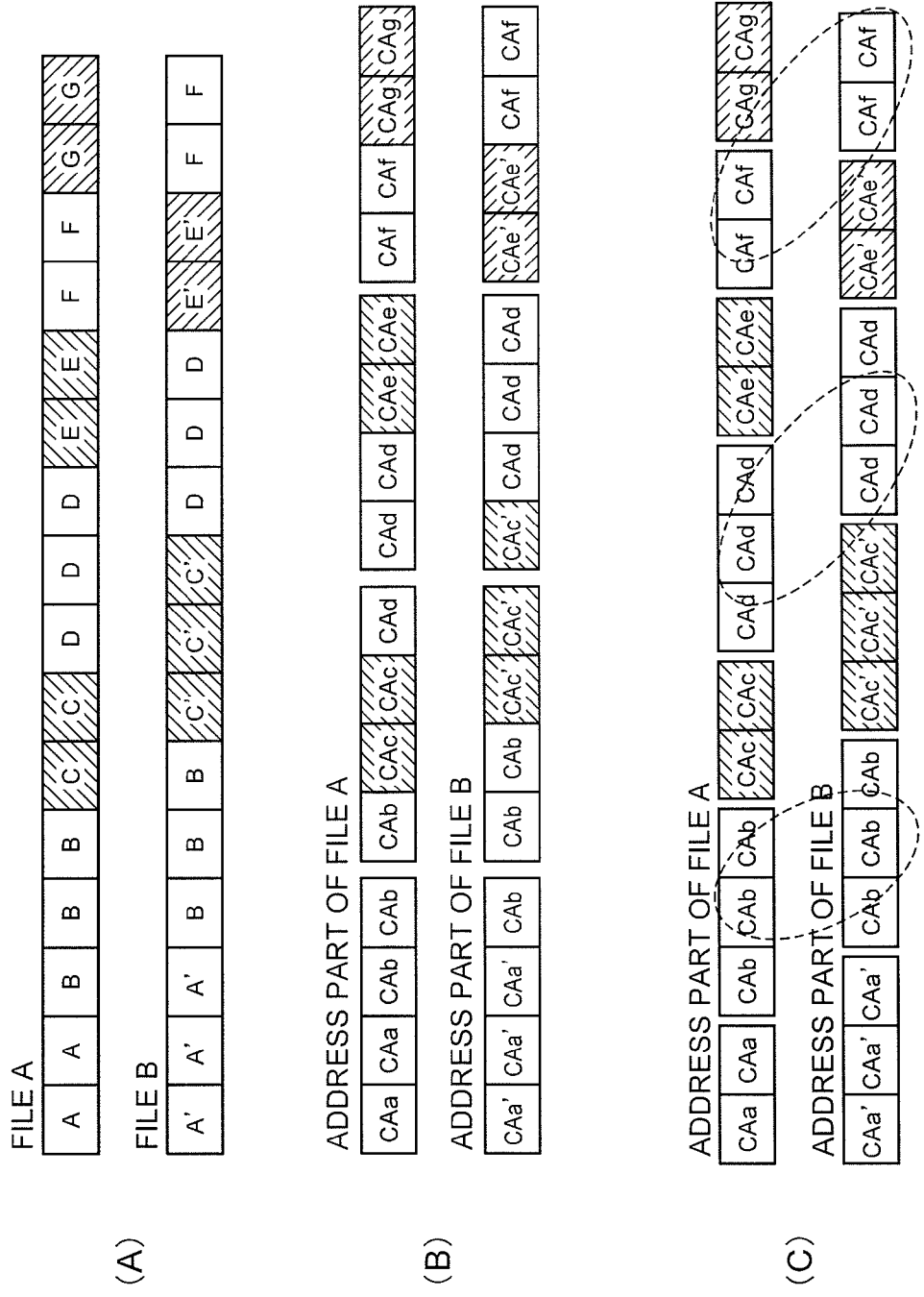
FIGS. 12A to 12C are views for explaining an aspect of data processing by a storage system of a third exemplary embodiment of the present invention.

Next, a third exemplary embodiment of the present invention will be described with reference to FIGS. 12A to 12C. FIGS. 12A to 12C are views for explaining an aspect of data stored in a storage node of this exemplary embodiment.

The storage node controlling unit 30 of a storage system of this exemplary embodiment has almost the same configuration as in the first and second exemplary embodiments described above, but specifically, has a function of dividing metadata at any place. For example, a key part and an address part separated from each other and configuring metadata are divided so that information stored in the key part and the address part become identical to information stored in a key part and an address part of other metadata.

An example of division is shown in FIG. 12C. Firstly, it is assumed that a file A and a file B configured as shown in FIG. 12A are stored in the storage system. Then, division data of the respective files are stored in the data unit. At this moment, division of content addresses stored in address parts of metadata referring to the respective division data, specifically, division of content addresses stored in the leaf node by a predetermined data amount is as shown in FIG. 12B.

On the other hand, in this exemplary embodiment, the storage controlling unit 30 divides content addresses within an address part configuring metadata of the file A and content addresses within an address part configuring metadata of the file B so as to be identical as shown in FIG. 12C. For example, since a place in which the same content addresses are gathered by the same number as shown by a dashed line region exists, the address parts of the metadata are divided at such a place.

Thus, for example, the address part of the file A can be referred to by metadata of an upper hierarchy of the file B. That is to say, it is possible to inhibit duplicate recording of data in a part shown by the dashed line region. As a result, it is possible to further reduce the storage amount in the whole storage system. Although the address part is divided in the above description, the key part may be divided.

<Fourth Exemplary Embodiment>

Figure 13:
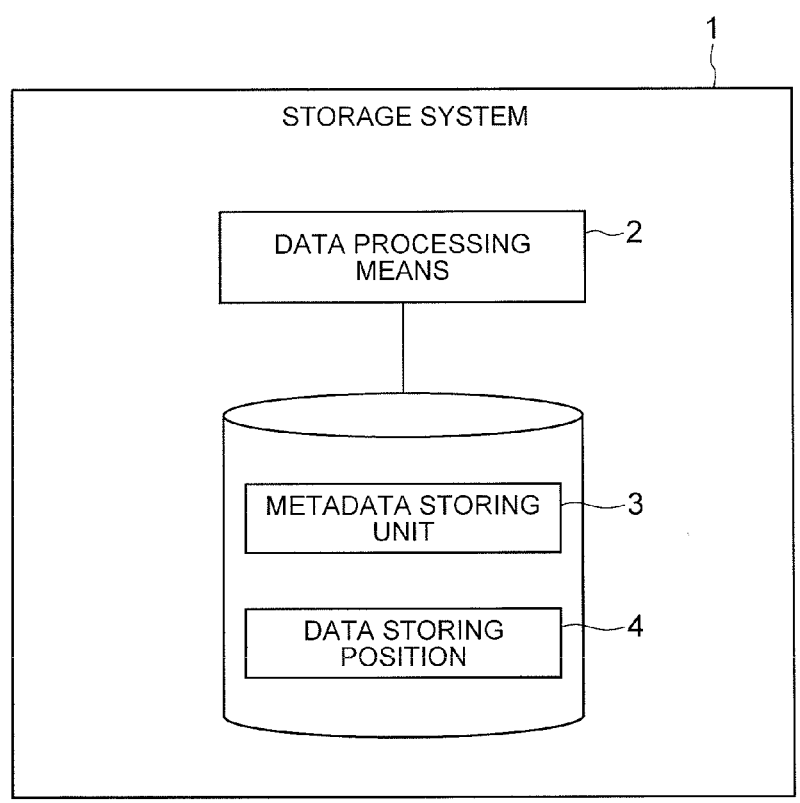
FIG. 13 is a function block diagram showing a configuration of a storage system of a fourth exemplary embodiment.
Figure 14:
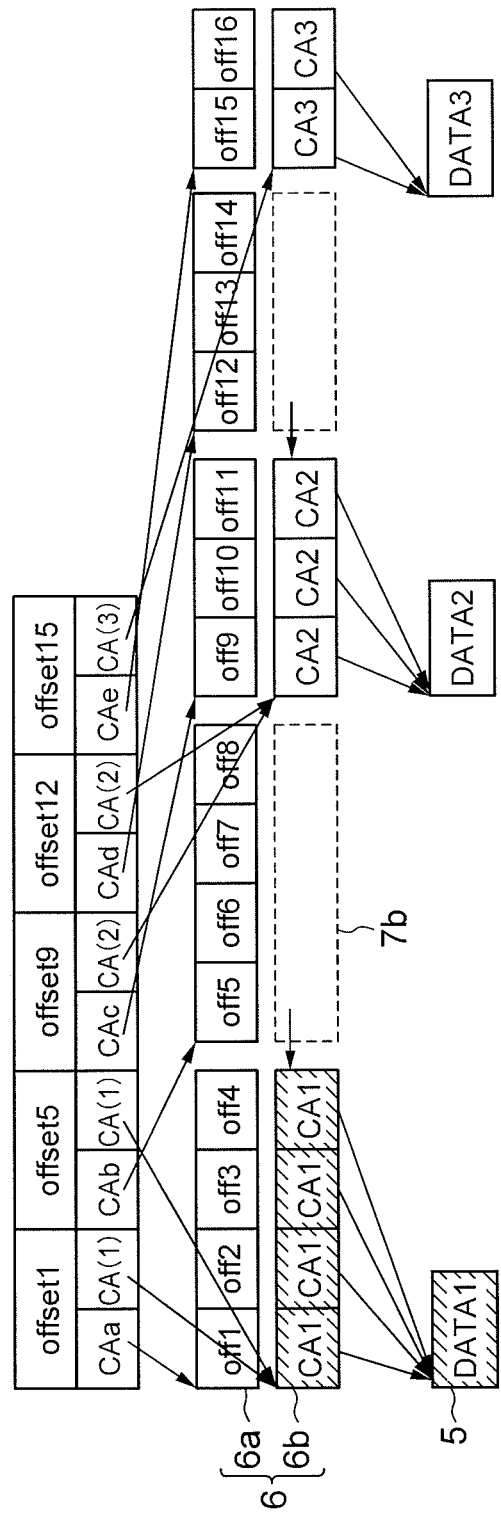
FIG. 14 is a data structure view showing an example of a structure of data stored in the storage system disclosed in FIG. 13.

A fourth exemplary embodiment of the present invention will be described with reference to FIGS. 13 and 14. FIG. 13 is a function block diagram showing a configuration of a storage system. FIG. 14 is a data structure view showing a structure of data stored in the storage system. This exemplary embodiment schematically describes the storage system.

As shown in FIG. 13, a storage system 1 in this exemplary embodiment includes:

a data storing unit 4 configured to store division data configuring a file;

a metadata storing unit 3 configured to store metadata representing a storing position of the division data; and a data processing means 2 configured to store the division data into the data storing unit and store the metadata representing the storing position of the division data into the metadata storing unit and, based on the metadata stored in the metadata storing unit, retrieve the division data stored in the data storing unit and reproduce the file.

Then, the data processing means 2 is configured to store the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part and the address part being configured by mutually separated data.

In the storage system described above, as shown in FIG. 14, firstly, at the time of storing a file, division data 5 of the file are stored into data storing units 4 of a plurality of storage devices, respectively. Then, metadata 6 representing a position in the file and a storing position in the data storing unit 4 of each of the division data 5 is stored into the metadata storing unit 3. After that, at the time of retrieving the file, with reference to the metadata 6, the position in the file and the storing position in the data storing unit of each of the division data 5 composing the file are specified, the division data 5 are retrieved from the data storing units 4 of the storage devices, and the file composed of the plurality of division data 5 is reproduced.

Then, in the storage system 1 configured as described above, in a case that other division data 5 having the same content as newly stored division data has already been stored in the data storing unit, metadata in which a storing position of the existing other division data 5 is a storing position of the newly stored division data is set and stored. Consequently, the need for duplicate storage of the division data having the same content is eliminated, and it is possible to reduce the amount of storage.

Figure 1:
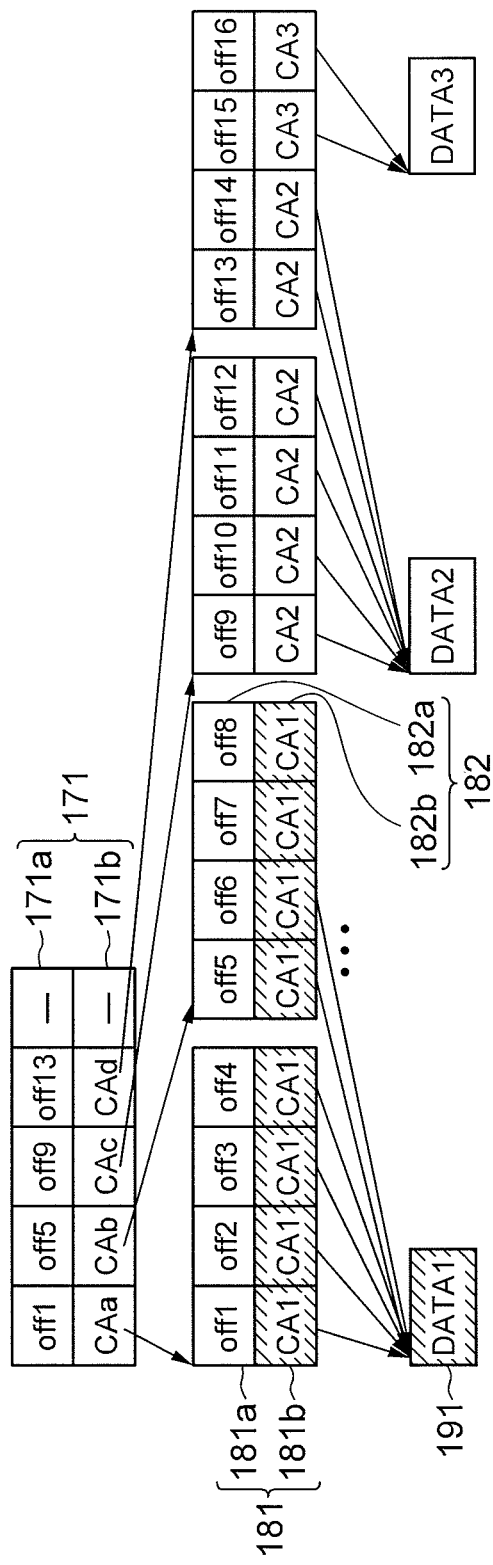
FIG. 1 is a data structure view showing a structure of data stored in a storage system relating to the present invention.

Furthermore, in the storage system 1 described above, as shown in FIG. 14, the metadata 6 has a key part 61 storing information representing the position in the file before being divided of the division data and an address part 62 storing information representing the storing position in the data storing unit of the division data, and the respective parts are separated and configured by different files. Therefore, in a case that duplicate of the division data is eliminated as described above, an address part of metadata may be a duplicate of another address part as shown by metadata denoted by reference numeral 182b in FIG. 1, but it is possible by referring to the other address part to eliminate the duplicate of data of the address part. That is to say, in the example of FIG. 14, it is possible to refer to an address part 6b of the metadata denoted by reference numeral 6 as an address part denoted by reference numeral 7b. Not only a duplicate of an address part but also a duplicate of a key part can be eliminated in a like manner. Therefore, it is possible to reduce the amount of storage of metadata, and it is possible to reduce the amount of storage in the whole storage system.

Further, in the storage system:

the data processing means is configured to store upper metadata representing a storing position of the metadata into the metadata storing unit; and the upper metadata has an upper meta-key part configured to store the position-in-file information representing the position in the file of the division data specified via the metadata in the storing position represented by the upper metadata, and an upper meta-address part configured to store address information representing storing positions of the key part and the address part of the metadata, respectively, so as to correspond to the one position-in-file information stored in the key part.

Further, in the storage system, the data processing means is configured to store the address information representing the storing position of the address part composing the existing metadata referred to by the other upper metadata, into the upper meta-address part of the upper metadata.

Further, in the storage system, the data processing means is configured to store the address information representing the storing position of the key part composing the existing metadata referred to by the other upper metadata, into the upper meta-address part of the upper metadata.

Thus, by reference by upper metadata to existing metadata whose key part and address part are separated, it is possible to efficiently eliminate duplicate data of the key part and the address part.

Further, in the storage system, the data processing means is configured to store the upper metadata having the upper meta-key part and the upper meta-address part configured by mutually separated data, into the metadata storing unit.

Further, in the storage system:

the data processing unit is configured to store the upper metadata that has the upper meta-key part and the upper meta-address part, that represents a storing position of the other upper metadata and that is positioned in an upper hierarchy than the other upper metadata, into the metadata storing unit; and the upper meta-address part of the upper metadata positioned in the upper hierarchy is configured to store address information respectively representing storing positions of the upper meta-key part and the upper meta-address part of the other upper metadata positioned in a lower hierarchy, so as to correspond to the one position-in-file information stored in the upper meta-key part.

Further, in the storage system, the data processing means is configured to store the address information representing a storing position of the upper meta-address part composing the existing upper metadata referred to by other upper metadata, into the upper meta-address part of the upper metadata positioned in the upper hierarchy.

Further, in the storage system, the data processing means is configured to store the address information representing a storing position of the upper meta-key part composing the existing upper metadata referred to by other upper metadata, into the upper meta-address part of the upper metadata positioned in the upper hierarchy.

Thus, by configuring an upper meta-key part and an upper meta-address part composing upper metadata so as to be separated, it is possible to refer to existing upper meta-key part and upper meta-address part by upper metadata positioned in a further upper hierarchy, and eliminate duplicate data. As a result, it is possible to further reduce the amount of storage in the whole storage system.

Further, in the storage system, the data processing means is configured to divide the key part and/or the address part of the metadata stored in the metadata storing unit, based on information stored in the key part and/or the address part and information stored in the key part and/or the address part of the other metadata.

Further, in the storage system, the data processing means is configured to divide the key part and/or the address part of the metadata so that the information stored in the key part and/or the address part becomes identical to the information stored in the key part and/or the address part of the other metadata.

Thus, by dividing a key part and an address part of metadata so as to become identical to information stored in a key part and an address part of other metadata, it is possible to generate duplicate information, and eliminate duplicate data of the key part and the address part. As a result, it is possible to further reduce the amount of storage in the whole storage system.

Further, the storage system includes an address table configured to, for each of the address information stored in the address part, store a count of reference of the address information to other data, and the data processing means is configured to, in accordance with the reference count of each of the address information stored in the address table, delete data referred to by the address information.

Further, the storage system includes an address table configured to, for each of the address information stored in the address part and the upper meta-address part, store a count of reference of the address information to other data, and the data processing means is configured to, in accordance with the reference count of each of the address information stored in the address table, delete data referred to by the address information.

Further, in the storage system, the data processing means is configured to delete data referred to by the address information whose reference count stored in the address table is 0.

Thus, by storing the reference counts of the respective address information, a process of deleting unnecessary data that is not referred to is facilitated. In this case, specifically, by eliminating a duplicate of address information as described above, the reference numbers of the respective address information become small, calculation of the address table is facilitated, and it is possible to realize rapid data processing.

Further, the storage system described above can be realized by installing a program into an information processing device. To be specific, a computer program of another exemplary embodiment of the present invention includes instructions for causing an information processing device including a data storing unit configured to store division data configuring a file and a metadata storing unit configured to store metadata representing a storing position of the division data, to realize:

a data processing means configured to store the division data into the data storing unit and store the metadata representing the storing position of the division data into the metadata storing unit and, based on the metadata stored in the metadata storing unit, retrieve the division data stored in the data storing unit and reproduce the file.

Then, the data processing means is configured to store the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part and the address part being configured by mutually separated data.

Further, in the computer program:

the data processing means is configured to store upper metadata representing a storing position of the metadata into the metadata storing unit; and the upper metadata has an upper meta-key part configured to store the position-in-file information representing the position in the file of the division data specified via the metadata in the storing position represented by the upper metadata, and an upper meta-address part configured to store address information representing storing positions of the key part and the address part of the metadata, respectively, so as to correspond to the one position-in-file information stored in the key part.

Further, as another exemplary embodiment of the present invention, a data structure of data stored in the storage system described above is a data structure of data stored in a metadata storing unit, in a storage system including:

a data storing unit configured to store division data configuring a file;

the metadata storing unit configured to store metadata representing a storing position of the division data; and a data processing means configured to store the division data into the data storing unit and store the metadata representing the storing position of the division data into the metadata storing unit and, based on the metadata stored in the metadata storing unit, retrieve the division data stored in the data storing unit and reproduce the file.

Then, the data structure of the data has the metadata having a key part configured to store position-in-file information representing a position in the file of the division data and an address part configured to store address information representing a storing position in which the division data is stored corresponding to the position represented by the position-in-file information so as to correspond to the position-in-file information, the metadata having the key part and the address part configured by mutually separated data.

Further, the data structure has upper metadata stored into the metadata storing unit by the data processing means and representing a storing position of the metadata, and the upper metadata has an upper meta-key part configured to store the position-in-file information representing the position in the file of the division data specified via the metadata in the storing position represented by the upper metadata, and an upper meta-address part configured to store address information representing storing positions of the key part and the address part of the metadata, respectively, so as to correspond to the one position-in-file information stored in the key part.

Further, as another exemplary embodiment of the present invention, a data processing method executed by operating the storage system described above includes, in an information processing device that includes a data storing unit configured to store division data configuring a file and a metadata storing unit configured to store metadata representing a storing position of the division data:

storing the division data into the data storing unit and storing the metadata representing the storing position of the division data into the metadata storing unit; and retrieving the division data stored in the data storing unit and reproducing the file based on the metadata stored in the metadata storing unit.

Then, the data processing method further includes, at the time of storing the division data or at any timing, storing the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part and the address part being configured by mutually separated data.

Further, the data processing method includes storing upper metadata representing a storing position of the metadata into the metadata storing unit, and the upper metadata has an upper meta-key part configured to store the position-in-file information representing the position in the file of the division data specified via the metadata in the storing position represented by the upper metadata, and an upper meta-address part configured to store address information representing storing positions of the key part and the address part of the metadata, respectively, so as to correspond to the one position-in-file information stored in the key part.

Inventions of a computer program, a data structure and a data processing method having the abovementioned configurations have like actions as the abovementioned storage system, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The present invention is based upon and claims the benefit of priority from Japanese patent application No. 2009-050062, filed on Mar. 4, 2009, the disclosure of which is incorporated herein in its entirety by reference.

INDUSTRIAL APPLICABILITY

The present invention can be utilized for a storage system configured by connecting a plurality of computers, and has industrial applicability.

DESCRIPTION OF REFERENCE NUMERALS 1 storage system
2 data processing means
3 metadata storing unit
4 data storing unit
10 storage system
10A accelerator node
10B storage node
11 backup system
12 backup device
20 file system unit
30 storage node controlling unit
31 content address controlling unit
40 content address unit
50 metadata unit
60 route node
61, 71, 81 metadata
70 index node
80 leaf node
81a key part
81b address unit
90 data unit
91 stored data

The invention claimed is:

1. A storage system comprising:
a data storing unit configured to store division data configuring a file;
a metadata storing unit configured to store metadata representing a storing position of the division data; and
a data processing unit configured to store the division data into the data storing unit and store the metadata representing the storing position of the division data into the metadata storing unit and, based on the metadata stored in the metadata storing unit, retrieve the division data stored in the data storing unit and reproduce the file,
wherein the data processing unit is configured to store the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part including plural pieces of position-in-file information and the address part including plural pieces of address information being configured by mutually separated different metadata,
the data processing unit is configured to store upper metadata representing a storing position of the metadata into the metadata storing unit; and
the upper metadata has an upper meta-key part configured to store the position-in-file information representing the position in the file of the division data specified via the metadata in the storing position represented by the upper metadata, and an upper meta-address part configured to store address information representing storing positions of the key part and the address part of the metadata, respectively, so as to correspond to the one position-in-file information stored in the key part.

2. The storage system according to claim 1, wherein the data processing unit is configured to store the address information representing the storing position of the address part composing the existing metadata referred to by the other upper metadata, into the upper meta-address part of the upper metadata.

3. The storage system according to claim 1, wherein the data processing unit is configured to store the address information representing the storing position of the key part composing the existing metadata referred to by the other upper metadata, into the upper meta-address part of the upper metadata.

4. The storage system according to claim 1, wherein the data processing unit is configured to store the upper metadata having the upper meta-key part and the upper meta-address part configured by mutually separated data, into the metadata storing unit.

5. The storage system according to claim 4, wherein:
the data processing unit is configured to store the upper metadata that has the upper meta-key part and the upper meta-address part, that represents a storing position of the other upper metadata and that is positioned in an upper hierarchy than the other upper metadata, into the metadata storing unit; and
the upper meta-address part of the upper metadata positioned in the upper hierarchy is configured to store address information respectively representing storing positions of the upper meta-key part and the upper meta-address part of the other upper metadata positioned in a lower hierarchy, so as to correspond to the one position-in-file information stored in the upper meta-key part.

6. The storage system according to claim 5, wherein the data processing unit is configured to store the address information representing a storing position of the upper meta-address part composing the existing upper metadata referred to by other upper metadata, into the upper meta-address part of the upper metadata positioned in the upper hierarchy.

7. The storage system according to claim 5, wherein the data processing unit is configured to store the address information representing a storing position of the upper meta-key part composing the existing upper metadata referred to by other upper metadata, into the upper meta-address part of the upper metadata positioned in the upper hierarchy.

8. The storage system according to claim 1, wherein the data processing unit is configured to divide the key part and/or the address part of the metadata stored in the metadata storing unit, based on information stored in the key part and/or the address part and information stored in the key part and/or the address part of the other metadata.

9. The storage system according to claim 8, wherein the data processing unit is configured to divide the key part and/or the address part of the metadata so that the information stored in the key part and/or the address part becomes identical to the information stored in the key part and/or the address part of the other metadata.

10. The storage system according to claim 1, comprising an address table configured to, for each of the address information stored in the address part, store a count of reference of the address information to other data,
wherein the data processing unit is configured to, in accordance with the reference count of each of the address information stored in the address table, delete data referred to by the address information.

11. The storage system according to claim 1, comprising an address table configured to, for each of the address information stored in the address part and the upper meta-address part, store a count of reference of the address information to other data,
wherein the data processing unit is configured to, in accordance with the reference count of each of the address information stored in the address table, delete data referred to by the address information.

12. The storage system according to claim 10, wherein the data processing unit is configured to delete data referred to by the address information whose reference count stored in the address table is 0.

13. A computer-readable storage medium that stores a program comprising instructions for causing an information processing device including a data storing unit configured to store division data configuring a file and a metadata storing unit configured to store metadata representing a storing position of the division data, to realize:
a data processing unit configured to store the division data into the data storing unit and store the metadata representing the storing position of the division data into the metadata storing unit and, based on the metadata stored in the metadata storing unit, retrieve the division data stored in the data storing unit and reproduce the file,
wherein the data processing unit is configured to store the metadata into the metadata storing unit, the metadata having a key part configured to store position-in-file information representing a position in the file of the division data and an address part configured to store address information representing a storing position in which the division data is stored corresponding to the position represented by the position-in-file information so as to correspond to the position-in-file information, and the key part including plural pieces of position-in-file information and the address part including plural pieces of address information being configured by mutually separated different meta data,
the data processing unit is configured to store upper metadata representing a storing position of the metadata into the metadata storing unit; and
the upper metadata has an upper meta-key part configured to store the position-in-file information representing the position in the file of the division data specified via the metadata in the storing position represent by the upper metadata, and an upper meta-address part configured to store address information representing storing positions of the key part and the address part of the metadata, respectively, so as to correspond to the one position-in-file information stored in the key part.

14. A data processing method comprising, in an information processing device that includes a data storing unit configured to store division data configuring a file and a metadata storing unit configured to store metadata representing a storing position of the division data:
storing the division data into the data storing unit and storing the metadata representing the storing position of the division data into the metadata storing unit;
retrieving the division data stored in the data storing unit and reproducing the file based on the metadata stored in the metadata storing unit;
storing the metadata into the metadata storing unit, the metadata having a key part configured to store positionin-file information representing a position in the file of the division data and an address part configured to store address information representing a storing position in which the division data is stored corresponding to the position represented by the position-in-file information so as to correspond to the position-in-file information, and the key part including plural pieces of position-in-file information and the address part including plural pieces of address information being configured by mutually separated different metadata, and storing upper metadata representing a storing position of the metadata into the metadata storing unit;

wherein the upper metadata has an upper meta-key part configured to store the position-in-file information representing the position in the file of the division data specified via the metadata in the storing position represented by the upper metadata, and an upper meta-address part configured to store address information representing storing positions of the key part and the address part of the metadata, respectively, so as to correspond to the one position-in-file information stored in the key part.

* * * * *